US008422345B2

(12) United States Patent
Yamamoto et al.

(10) Patent No.: US 8,422,345 B2
(45) Date of Patent: Apr. 16, 2013

(54) OPTICAL INFORMATION STORAGE MEDIUM REPRODUCTION APPARATUS AND CONTROL METHOD OF THE SAME

(75) Inventors: Masaki Yamamoto, Osaka (JP); Hirohisa Yamada, Osaka (JP); Yasuhiro Harada, Osaka (JP); Go Mori, Osaka (JP); Hideharu Tajima, Osaka (JP); Shigemi Maeda, Osaka (JP); Yoshiteru Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/814,168

(22) Filed: Jun. 11, 2010

(65) Prior Publication Data

US 2010/0246346 A1 Sep. 30, 2010

Related U.S. Application Data

(62) Division of application No. 12/734,169, filed as application No. PCT/JP2008/067327 on Sep. 25, 2008.

(30) Foreign Application Priority Data

Oct. 19, 2007 (JP) .................................. 2007/273204

(51) Int. Cl.
G11B 7/00 (2006.01)
G11B 7/24 (2006.01)

(52) U.S. Cl.
USPC .... 369/47.5; 369/59.11; 369/116; 369/275.1; 369/283

(58) Field of Classification Search .................... None
See application file for complete search history.

(56) References Cited

U.S. PATENT DOCUMENTS 6,965,556 B1 11/2005 Kikukawa et al.
RE39,322 E 10/2006 Ohsawa et al.
(Continued)

FOREIGN PATENT DOCUMENTS

CN 1388525 A 1/2003
CN 1886789 A 12/2006
(Continued)

OTHER PUBLICATIONS

English version of ISR for PCT/JP2008/067327.
(Continued)

Primary Examiner — Muhammad N Edun
(74) Attorney, Agent, or Firm — Edwards Wildman Palmer LLP; David G. Conlin; Stephen D. LeBarron

(57) ABSTRACT

In an optical information storage medium reproduction apparatus (10) for reproducing an optical information storage medium including a plurality of information recording layers each including a recording mark having a length shorter than an optical system resolution limit, reproduction laser power for reading an information recording layer closest to a reproduction-laser-incident surface of the optical information storage medium is set to be lower than reproduction laser power for reading an information recording layer farthest from the reproduction-laser-incident surface but not lower than minimum reproduction laser power that satisfies a reproduction signal characteristic that the optical information storage medium reproduction apparatus (10) requires. With the arrangement, it is possible to prevent that the information recording layer closest to the reproduction-laser-incident surface is irradiated wrongly with reproduction laser having high reproduction laser power, thereby making it possible to obtain successful reproduction quality. That is, it is possible to realize the optical information storage medium reproduction apparatus (10) that can set optimum reproduction laser power and perform stable super resolution reproduction.

1 Claim, 5 Drawing Sheets

U.S. PATENT DOCUMENTS

| | | | |
|---|---|---|---|
| RE39,463 E | | 1/2007 | Ohsawa et al. |
| RE40,556 E | | 10/2008 | Ohsawa et al. |
| 7,680,025 B2 * | | 3/2010 | Shintani et al. ............ 369/275.5 |
| 2002/0122368 | A1 | 9/2002 | Lee et al. |
| 2002/0145952 | A1 | 10/2002 | Kono |
| 2002/0176971 | A1 | 11/2002 | Ohsawa et al. |
| 2004/0247815 | A1 | 12/2004 | Takamori et al. |
| 2005/0030846 | A1 | 2/2005 | Kono |
| 2005/0030869 | A1 | 2/2005 | Lee |
| 2005/0073935 | A1 | 4/2005 | Miura et al. |
| 2005/0153108 | A1 | 7/2005 | Kim et al. |
| 2005/0237912 | A1 | 10/2005 | Kikukawa et al. |
| 2005/0259563 | A1 | 11/2005 | Ahn et al. |
| 2005/0276188 | A1 | 12/2005 | Lee et al. |
| 2006/0072415 | A1 | 4/2006 | Lee et al. |
| 2006/0072446 | A1 | 4/2006 | Lee et al. |
| 2006/0192017 | A1 | 8/2006 | Tajima et al. |
| 2006/0203680 | A1 | 9/2006 | Hong et al. |

FOREIGN PATENT DOCUMENTS

| | | |
|---|---|---|
| JP | 7-105568 | 4/1995 |
| JP | 2001-176077 | 6/2001 |
| JP | 2001-250274 A | 9/2001 |
| JP | 2003-242655 | 8/2003 |
| JP | 2004-362718 A | 12/2004 |
| JP | 2005-93069 | 4/2005 |
| JP | 2007-26503 | 2/2007 |
| JP | 2007-95211 | 4/2007 |
| JP | 2007-521605 | 8/2007 |

OTHER PUBLICATIONS

U.S. Office Action dated May 25, 2011 issued in connection with family application U.S. Appl. No. 12/814,111.

U.S. Office Action dated May 26, 2011 issued in connection with family application U.S. Appl. No. 12/814,133.

U.S. Office Action dated May 25, 2011 issued in connection with family application U.S. Appl. No. 12/814,153.

Office Action dated Mar. 31, 2011 issued in corresponding Chinese Application No. 201010202590.8 with English translation.

Office Action dated Apr. 28, 2011 issued in connection with related U.S. Appl. No. 12/734,169.

U.S. Office Action dated Jul. 29, 2011 issued in connection with family U.S. Appl. No. 12/814,091.

U.S. Office Action dated Oct. 13, 2011 issued in connection with family U.S. Appl. No. 12/734,169.

U.S. Office Action issued Nov. 17, 2011 in connection with family U.S. Appl. No. 12/814,091.

U.S. Office Action issued Nov. 9, 2011 in connection with family U.S. Appl. No. 12/814,111.

U.S. Office Action issued Nov. 10, 2011 in connection with family U.S. Appl. No. 12/814,133.

U.S. Office Action issued Nov. 9, 2011 in connection with family U.S. Appl. No. 12/814,153.

Advisory Action dated Dec. 9, 2011 issued in connection with family U.S. Appl. No. 12/734,169.

Advisory Action dated Jan. 23, 2012 issued in connection with family U.S. Appl. No. 12/814,091.

Advisory Action dated Jan. 19, 2012 issued in connection with family U.S. Appl. No. 12/814,111.

Advisory Action dated Jan. 18, 2012 issued in connection with famly U.S. Appl. No. 12/814,133.

Advisory Action dated Jan. 18, 2012 issued in connection with family U.S. Appl. No. 12/814,153.

U.S. Office Action dated Jun. 5, 2012 issued in connection with related family U.S. Appl. No. 12/814,111.

U.S. Office Action dated Jun. 7, 2012 issued in connection with related family U.S. Appl. No. 12/814,133.

U.S. Office Action dated Jun. 5, 2012 issued in connection with related family U.S. Appl. No. 12/814,153.

U.S. Office Action issued May 18, 2012 in connection with family U.S. Appl. No. 12/814,091.

* cited by examiner

F I G. 7
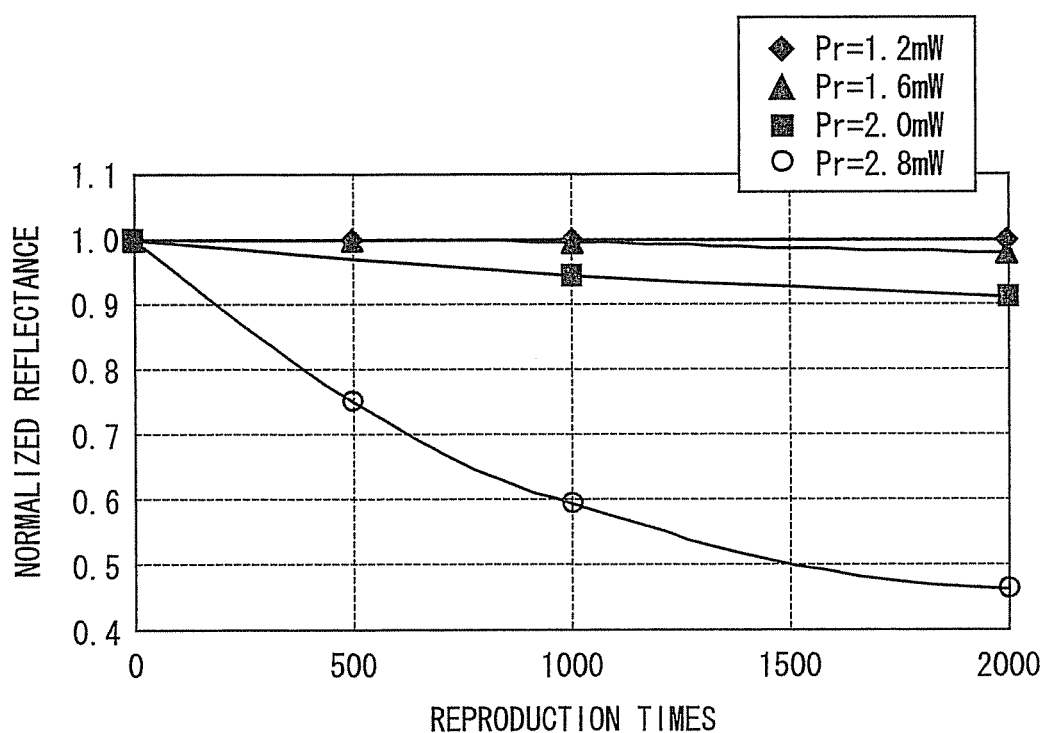

OPTICAL INFORMATION STORAGE MEDIUM REPRODUCTION APPARATUS AND CONTROL METHOD OF THE SAME

CROSS-REFERENCE TO RELATED APPLICATIONS

This application is a divisional application of U.S. Ser. No. 12/734,169, filed on Apr. 14, 2010 which is a national stage application pursuant to 35 U.S.C. §371 of PCT application PCT/JP2008/067327, filed Sept. 25, 2008, which claims the benefit of Japanese Application No. 273204/2007, filed Oct. 19, 2007. The entire contents of the aforementioned applications are hereby incorporated herein by this reference.

TECHNICAL FIELD

The present invention relates to an optical information storage medium reproduction apparatus for reproducing an optical information storage medium by use of a super resolution reproduction technique, and a control method of the optical information storage medium reproduction apparatus.

BACKGROUND ART

In recent years, information technology, information communication technology, and multimedia technology have been greatly advanced. This increases demand for an increase in density and capacity of an optical information storage medium.

To cope with such demand, there have been developed various techniques, such as multilayer techniques for forming information recording layers in a multilayered manner and super resolution techniques using a reproduction layer that allows reading of a recording mark shorter than a resolution limit of an optical information storage medium reproduction apparatus.

Initially explained is one of the multilayer techniques. The following describes a double-layer technique, which is most simple among the multilayer techniques. As disclosed in Patent Literature 1, for example, a double-layer optical information storage medium has such a structure that a first information recording layer and a second information recording layer are provided in this order from a side of a reproduction-laser-striking surface of the double-layer optical information storage medium, and an intermediate layer is provided therebetween so that the first and second information recording layers are separated from each other. In this arrangement, since the first recording layer is a translucent layer that passes reproduction light therethrough, a reproduction laser entering from the reproduction-layer-incident surface can be focused onto either of the first and second information recording layers so that information can be recorded in or read from the either of the first and second information recording layers. Accordingly, with the use of the double-layer technique, it is possible to approximately double an information recording capacity of the optical information storage medium, by simple arithmetic.

For a structure of an optical information storage medium having at least 3 information recording layers, it is also possible to adopt, similarly to the above example of the double-layer technique, such a structure that a first recording layer, a second recording layer, a third recording layer, . . . , and an nth recording layer are provided in this order from a side of a reproduction-laser-incident surface of the optical information storage medium, and an intermediate layer is sandwiched between two of these information recording layers so as to separate them from one another.

Further, the above optical information storage media do not employ any super resolution techniques. Therefore, in the optical information storage media, a shortest recording mark length in each of the layers is longer than a resolution limit of an optical information storage medium reproduction apparatus.

The following explains about the super resolution techniques. The super resolution technique is a technique for read a signal having a recording mark length shorter than an optical resolution limit (hereinafter, referred to as optical diffraction limit) in a reproduction optical system. More specifically, a light spot diameter is represented by $\lambda/NA$ substantially, where $\lambda$ is a wavelength of light emitted from a light source and NA is a numerical aperture of an objective lens for forming a light spot.

That is, the super resolution technique is a technique for recording/reading a recording mark having a recording mark length equal to or less than this optical diffraction limit. Further, reproduction of an optical information storage medium with the use of the super resolution technique is referred to as super resolution reproduction.

Further, it has been known that a length of a resolution limit of a conventional optical information reproduction apparatus, which does not use the super resolution technique, is around $\lambda/(4NA)$, which is one fourth of the light spot diameter. In the following description, this limit is simply referred to as a resolution limit. It should be noted that since the resolution limit is actually affected by elements in an optical system in addition to the theory, there might be some differences between an actual value of the resolution limit and a theoretical value obtained from the wavelength and the numerical aperture.

As described above, with the use of the super resolution technique, it is possible to record/read a recording mark having a recording mark length longer than the resolution limit. This can improve an information recording capacity of the optical information storage medium.

Patent Literature 2 proposes a super resolution optical information storage medium that uses, as the super resolution technique, a super resolution technique utilizing prepits each made up in a form of a concavity or a convexity, which super resolution technique contributes to reading of information called Super-ROM.

This super resolution optical information storage medium has not been clarified yet in detail in terms of a reproduction mechanism. However, by using Mo, W, Si, Ge, and the like material instead of Al and Au, which are conventionally used, to form a reflection layer of a read-only disk, it is possible to read a signal having a recording pit length shorter than the resolution limit, which signal cannot be read by a conventional optical system.

Further, a so-called multilayer super resolution technique, which is a technique that combines the aforementioned multilayer technique and super resolution technique, that is, a technique in which the super resolution technique is applied to each information recording layer in a multilayer optical information storage medium, is expected as a technique that allows a further increase in the information recording capacity. The multilayer super resolution technique may adopt the aforementioned double-layer technique as the multilayer technique. It is called a double-layer super resolution technique.

Citation List

Patent Literature 1

Japanese Patent Application Publication, Tokukai, No. 2007-026503 A (Publication Date: Feb. 1, 2007)

Patent Literature 2

Japanese Patent Application Publication, Tokukai, No. 2001-250274 A (Publication Date: Sep. 14, 2001)

Patent Literature 3

Japanese Patent Application Publication, Tokukai, No. 2004-362718 A (Publication Date: Dec. 24, 2004)

Generally, the super resolution reproduction in the super resolution techniques requires reproduction laser power higher than power that is normally required. As one example of the super resolution techniques, there is a mask-type super resolution technique in which a so-called mask layer is provided on an information recording layer.

There are two types as the mask-type super resolution technique depending on characteristics, a heat-mode type and a photon-mode type. In either case, formation of a mask region and an aperture region requires a high temperature and a large amount of light in a medium. This requires reproduction laser power higher than power that is normally required. In addition, it has been also reported that other super resolution techniques, such as the super resolution technique disclosed in Patent Literature 2, require reproduction laser power higher than power that is normally required.

However, reading of an information recording layer with inappropriately high reproduction laser power may damage recording marks.

SUMMARY OF INVENTION

The present invention is accomplished in view of the above problems. An object of the present invention is to provide (i) an optical information storage medium reproduction apparatus by which a multilayer super resolution optical information storage medium, which is a high-density optical information storage medium, is stably reproduced, and (ii) a control method of the optical information storage medium reproduction apparatus.

In order to achieve the above object, an optical information storage medium reproduction apparatus according to the present invention is an optical information storage medium reproduction apparatus for reproducing an optical information storage medium in which a plurality of information recording layers are laminated, each of the plurality of information recording layers including a recording mark having a length shorter than an optical system resolution limit, and the optical information storage medium reproduction apparatus reads an information recording layer closest to a reproduction-laser-incident surface of the optical information storage medium, with reproduction laser power that is set to be lower than reproduction laser power for reading an information recording layer farthest from the reproduction-laser-incident surface but not lower than minimum reproduction laser power that satisfies a reproduction signal characteristic that the optical information storage medium reproduction apparatus requires.

Further, in order to achieve the above object, an optical information storage medium reproduction apparatus according to the present invention is an optical information storage medium reproduction apparatus for reproducing an optical information storage medium in which a plurality of information recording layers are laminated, each of the plurality of information recording layers including a recording mark having a length not longer than 120 nm, which optical information storage medium reproduction apparatus includes an optical system including a laser light source capable of irradiating laser light having a wavelength of not less than 400 nm but not more than 410 nm and an objective lens having a numerical aperture of not less than 0.83 but not more than 0.87, and the optical information storage medium reproduction apparatus reads an information recording layer closest to a reproduction-laser-incident surface of the optical information storage medium, with reproduction laser power that is set to be lower than reproduction laser power for reading an information recording layer farthest from the reproduction-laser-incident surface but not lower than minimum reproduction laser power that satisfies a reproduction signal characteristic that the optical information storage medium reproduction apparatus requires.

Further, in order to achieve the above object, a control method according to the present invention is a control method for controlling an information storage medium reproduction apparatus for reproducing an optical information storage medium in which a plurality of information recording layers are laminated, each of the plurality of information recording layers including a recording mark having a length shorter than an optical system resolution limit, and the control method includes setting, at the time of reading an information recording layer closest to a reproduction-laser-incident surface of the optical information storage medium, reproduction laser power to be lower than reproduction laser power for reading an information recording layer farthest from the reproduction-laser-incident surface but not lower than minimum reproduction laser power that satisfies a reproduction signal characteristic that the optical information storage medium reproduction apparatus requires.

In the above arrangement, at the time of reading the information recording layer closest to the reproduction-laser-incident surface of the optical information storage medium, the optical information storage medium reproduction apparatus sets reproduction laser power to be lower than reproduction laser power for reading the information recording layer farthest from the reproduction-laser-incident surface but not lower than minimum reproduction laser power that satisfies a reproduction signal characteristic that the optical information storage medium reproduction apparatus requires. Accordingly, the optical information storage medium reproduction apparatus reads the information recording layer closest to the reproduction-laser-incident surface by irradiating the information recoding layer with laser light having the reproduction laser power thus set. As a result, with the above arrangement, it is possible to prevent that the information recording layer closest to the reproduction-laser-incident surface is read with inappropriately high reproduction laser power, thereby making it possible to prevent a decrease in reflectance and a deterioration in reproduction signal characteristic along with repeat reproduction. Consequently, it is possible to stably reproduce a multilayer super resolution optical information storage medium like the above optical information storage medium.

In a case where a conventional optical information storage medium reproduction apparatus reproduces a multilayer information storage medium including n (n is an integer not less than 2) information recording layers, the same reproduction laser power is employed to read a first information recording layer, which is first from the reproduction-laser-incident surface, and an nth information recording layer, which is nth from the reproduction-laser-incident surface. For example, in a case where a conventional double-layer optical information storage medium is reproduced, a first information recording layer and a second information recording layer are read with the same reproduction laser power.

In view of this, the inventor(s) of the present invention found the following fact. That is, in the case where the first information recording layer and the second information recording layer of the double-layer super resolution optical information storage medium are read with the same reproduction laser power as such, recording marks of the first information recording layer are damaged, thereby resulting in that information stored in the first information recording layer is rendered unreadable.

The above arrangement of the present invention is applicable to an optical information storage medium reproduction apparatus including an optical system constituted by (i) a laser light source capable of irradiating laser light which is like a blue laser employed by a Blu-ray Disc (registered trademark) reproduction apparatus and which has a wavelength of not less than 400 nm but not more than 410 nm, and (ii) an objective lens having a numerical aperture of 0.85. It should be noted that even if the numerical aperture has an error of around ±0.02, it hardly affects the advantageous effects of the present invention. On this account, the numerical aperture may be not less than 0.83 but not more than 0.87.

Furthermore, the above arrangement of the present invention is also applicable to reading of information recording layers, such as an information recording layer on which a plurality of recording marks including a recording mark shorter than 120 nm have been formed, and an information recording layer in which information is to be recorded in the form of a plurality of recording marks including a recording mark shorter than 120 nm.

The above optical information storage medium may be a read-only optical information storage medium (read-only type) in which information has been already recorded, or an optical information storage medium (writable/readable type) in which a piece of information has been recorded in a part of an information recording layer and another piece of information may be additionally recorded therein and in which the piece of information has been recorded in at least one of a plurality of information recording layers.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 shows one embodiment of the present invention and is a block diagram schematically illustrating an arrangement of an essential part of an optical information storage medium reproduction apparatus.

FIG. 2 shows one embodiment of the present invention and is a block diagram schematically showing an arrangement of an optical information storage medium reproduction apparatus.

FIG. 3 is a cross-sectional view schematically illustrating an exemplary double-layer optical information storage medium according to the present invention.

FIG. 4 is a graph showing reproduction-laser-power dependence of jitter of an optical information storage medium reproduction apparatus of Reference Example 1 in the present invention.

FIG. 5 is a graph showing reproduction-laser-power dependence of bER measured at the time of reproducing a disk #1 of the present invention and an optical information storage medium of Comparative Example 1.

FIG. 6 is a graph showing reproduction-laser-power dependence of CNR measured at the time of reproducing a disk #2 of the present invention and an optical information storage medium of Comparative Example 2.

FIG. 7

FIG. 7 is a graph showing reproduction-time dependence of normalized reflectance of a first information recording layer of an optical information storage medium as the disk #1 of the present invention.

REFERENCE SIGNS LIST

10 Optical Information Storage Medium Reproduction Apparatus
12 Polarization Beam Splitter (Optical System)
13 Laser Light Resource (Optical System)
15 Detector (Optical System)
19 Control Section
21 Optical Pickup (Optical System)
26 Power Control Section
100 Optical Information Storage Medium
100a Super Resolution Optical Information Storage Medium
100d Double-layer Super Resolution Optical Information Storage Medium (Optical Information Storage Medium)
100e Double-layer Super Resolution Optical Information Storage Medium (Optical Information Storage Medium)
101 Light-transmitting Layer
102 First Information Recording Layer (Information Recording Layer Closest to Reproduction-laser-incident Surface)
103 Intermediate Layer
104 Second Information Recording Layer (Information Recording Layer Farthest from Reproduction-laser-incident Surface)
105 Substrate Description Of Embodiments One embodiment is described below with reference to FIG. 1 through FIG. 7.

(Optical Information Storage Medium Reproduction Apparatus)

Figure 2:
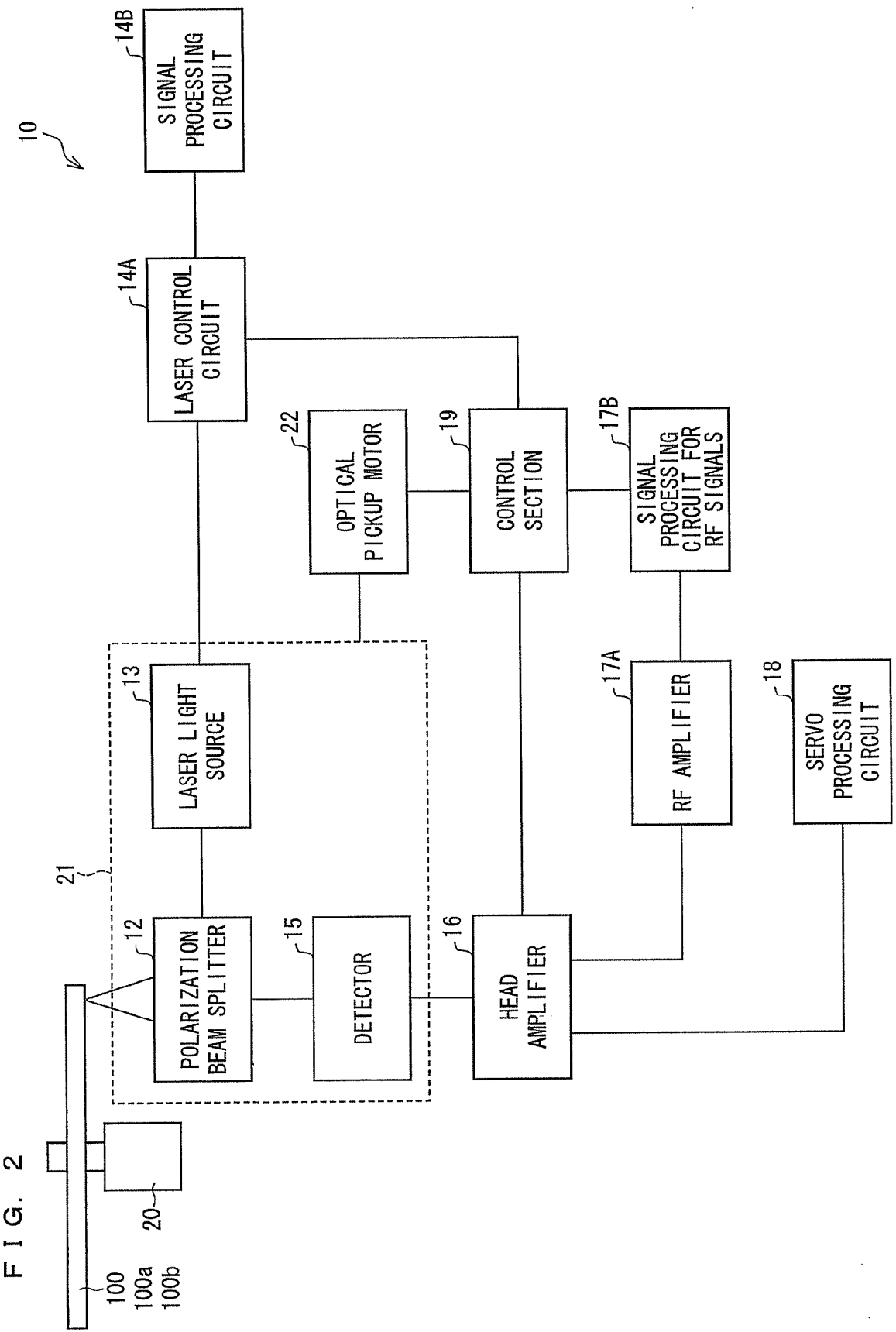
FIG. 2

FIG. 2 is a block diagram schematically illustrating one exemplary arrangement of an optical information storage medium reproduction apparatus according to the present embodiment. An optical information storage medium reproduction apparatus 10 illustrated in FIG. 2 can optically reproduce an optical information storage medium 100. The optical information storage medium 100 may be a double-layer super resolution optical information storage medium 100a or a normal optical information storage medium 100b other than the double-layer super resolution optical information storage medium.

The present embodiment deals with, as an example, a case where the double-layer super resolution optical information storage medium 100a is reproduced as a multilayer super resolution optical information storage medium that is reproduced by the optical information storage medium reproduction apparatus 10. However, the present embodiment is not limited to this, and a super resolution optical information storage medium having at least 3 layers may be reproduced by the optical information storage medium reproduction apparatus 10. Further, the normal optical information storage medium 100*b* that is reproduced by the optical information storage medium reproduction apparatus 10 may be an optical information storage medium having at least 2 information recording layers.

As illustrated in FIG. 2, the optical information storage medium reproduction apparatus 10 includes a laser control circuit 14A, a signal processing circuit 14B, a head amplifier 16, an RF amplifier 17A, a signal processing circuit 17B for RF signals, a servo processing circuit 18, a control section 19, a spindle motor 20, an optical pickup 21, and an optical pickup motor 22. The optical pickup 21 includes a polarization beam splitter 12, a laser light source 13, and a detector 15.

In the optical information storage medium reproduction apparatus 10, initially, the spindle motor 20 rotates the optical information storage medium 100, and the control section 19 controls the optical pickup motor 22 to move the optical pickup 21. Then, the laser control circuit 14A causes the laser light source 13 to emit reproduction laser light.

The signal processing circuit 14B is for generating a signal for use in the laser control circuit 14A. For example, in a case where the optical information storage medium reproduction apparatus 10 has a function of recording information in an optical information storage medium, the signal processing circuit 14B generates a recording signal so that the laser control circuit 14A controls the laser light source 13 by use of the recording signal.

The reproduction laser light passes through the polarization beam splitter 12 and then strikes the optical information storage medium 100. Reflection light reflected off the optical information storage medium 100 returns to the polarization beam splitter 12 and then reaches the detector 15 via the polarization beam splitter 12. The optical pickup 21 includes an objective lens (not shown). A laser wavelength and a numerical aperture for use in a Blue-ray Disc (registered trademark) reproduction apparatus may be used, respectively, as a laser wavelength of laser light emitted from the laser light source 13 and as a numerical aperture of the objective lens. In this case, the laser wavelength is substantially 405 nm, and the numerical aperture is substantially 0.85.

The detector 15 outputs an electrical signal based on the received reflection light. The electrical signal is fed to the head amplifier 16 so as to be amplified. The electrical signal thus amplified is then fed to the servo processing circuit 18 so as to cause the servo processing circuit 18 to perform various servo controls. Further, the electrical signal is fed to the RF amplifier 17A so as to be amplified further, and then fed to the signal processing circuit 17B. The electrical signal is then fed to the control section 19 via the signal processing circuit 17B.

(Control Section of Optical Information Storage Medium Reproduction Apparatus)

Figure 1:
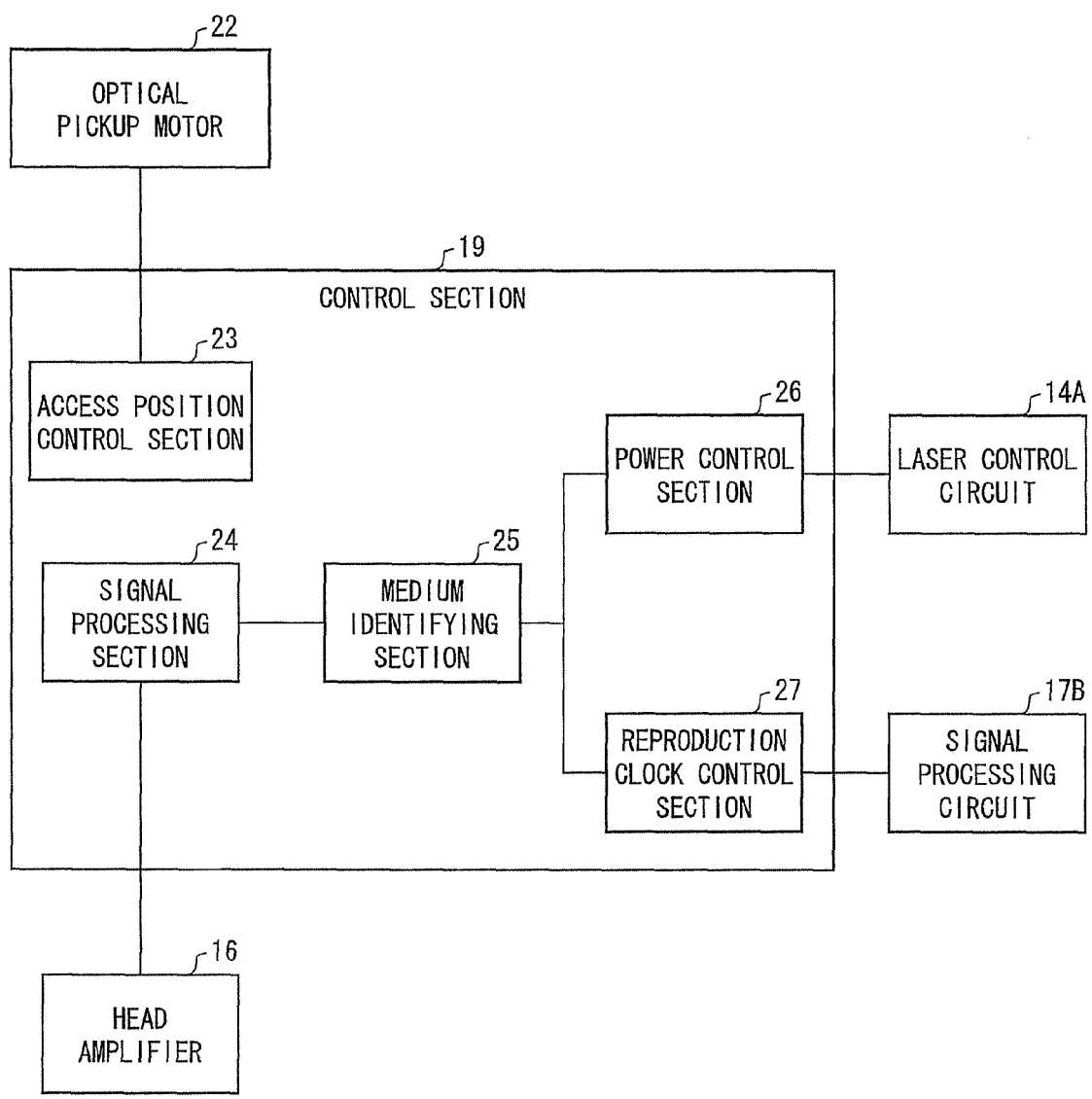
FIG. 1

By referring to FIG. 1, the following describes the control section 19 of the optical information storage medium reproduction apparatus 10, more specifically. FIG. 1 is a block diagram illustrating an essential part of the control section 19. As illustrated in FIG. 1, the control section 19 includes an access position control section 23, a signal processing section 24, a medium identifying section 25, a power control section 26, and a reproduction clock control section 27.

The access position control section 23 controls the optical pickup motor 22 so that the optical pickup 21 can make access to a desired position on the optical information storage medium 100.

The signal processing section 24 processes a medium identification signal fed from the head amplifier 16, and then supplies the medium identification signal to the medium identifying section 25. The medium identifying section 25 identifies whether or not the optical information storage medium 100 is a double-layer super resolution optical information storage medium 100*a*, based on the medium identification signal supplied from the signal processing section 24.

When the optical information storage medium 100 is identified as the double-layer super resolution optical information storage medium 100*a*, based on a result of the identification by the medium identifying section 25, the power control section 26 controls the laser control circuit 14A so as to set reproduction laser power. More specifically, for reading of a first information recording layer, reproduction laser power Pr1 for the first information recording layer is set. For reading of a second information recording layer, reproduction laser power Pr2 for the second information recording layer is set. The reproduction laser power Pr1 for the first information recording layer and the reproduction laser power Pr2 for the second information recording layer will be described later more specifically.

The reproduction clock control section 27 switches a reproduction clock for use in the signal processing circuit 17B, between a reproduction clock suitable for a normal optical information storage medium 100*b* and a reproduction clock suitable for a super resolution optical information storage medium 100*a*, based on the result of the identification of the optical information storage medium 100 by the medium identifying section 25.

Figure 3:
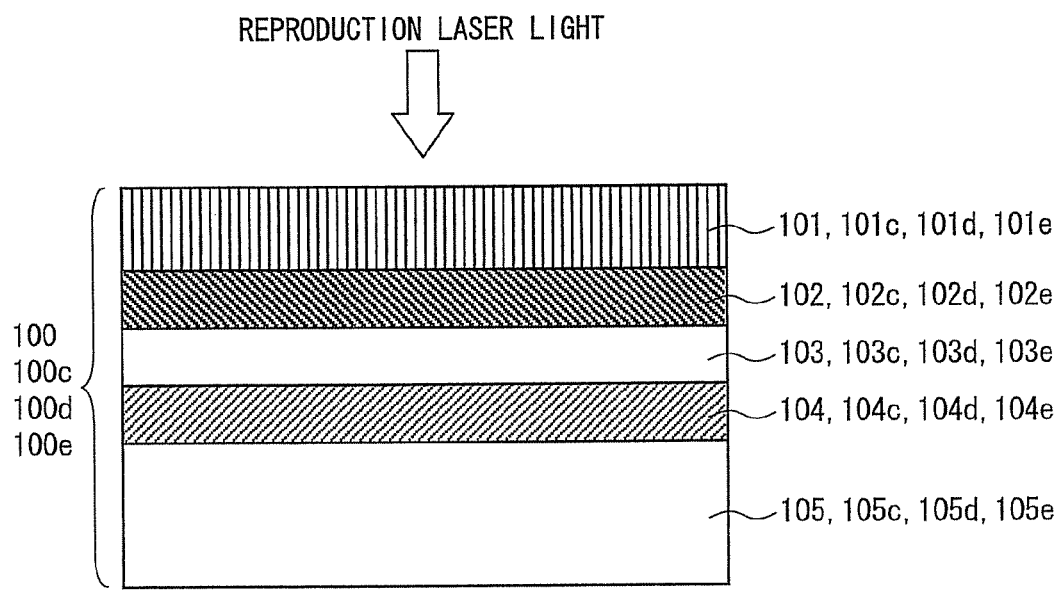
FIG. 3

The following explains about the super resolution optical information storage medium 100*a* with reference to FIG. 3. FIG. 3 is a cross-sectional view schematically illustrating a double-layer information storage medium. In this explanation, assume that the super resolution optical information storage medium 100*a* is a double-layer super resolution optical information storage medium, for example. The super resolution optical information storage medium 100*a* includes a floodlight layer 101*a*, a first information recording layer 102*a*, an intermediate layer 103*a*, a second information recording layer 104*a*, and a substrate 105*a*.

The optical information storage medium reproduction apparatus 10 reads information stored in the optical information storage medium 100 by use of a reproduction clock received from the reproduction clock control section 27 and an electrical signal received from the RF amplifier 17A via the signal processing circuit 17B.

Further, the following describes which information recording layer is to be focused, the first information recording layer 102*a* or the second information recording layer 104*a*, in a case where the super resolution optical information storage medium 100*a* is reproduced. When a focus search process is performed by moving the objective lens (not shown) of the optical pickup 21 in order from a position away from the super resolution optical information storage medium 100*a* toward a focus direction, a focus error signal for use in the servo processing circuit 18 exhibits an S-shaped characteristic every time the focus error signal passes through each of the information recording layers. At this time, it is counted how many times the S-shaped characteristic is exhibited, and the optical pickup 21 is controlled in accordance with the counted number so as to select either the first information recording layer 102*a* or the second information recording layer 104*a*, accordingly.

(How to Identify Optical Information Storage Medium)

Next will be explained how to identify whether an optical information storage medium 100 to be reproduced by the optical information storage medium reproduction apparatus 10 is a double-layer super resolution optical information storage medium 100*a* or not.

One of the methods is such that medium information indicative of whether or not the optical information storage medium 100 is a double-layer super resolution optical information storage medium 100a is added to the optical information storage medium 100 in a predetermined manner.

More specifically, medium information indicating that an optical information storage medium to be reproduced is the double-layer super resolution optical information storage medium 100a is stored in the double-layer super resolution optical information storage medium 100a in the form of recording marks having a recording mark length not shorter than a resolution limit of the optical information storage medium reproduction apparatus 10. The medium information is read with low reproduction laser power used for the normal optical information storage medium 100b. Herewith, it is possible to judge whether or not the optical information storage medium 100 is a double-layer super resolution optical information storage medium 100a, based on the medium information.

With the arrangement, it is possible to prevent such a problem that the first information recording layer or the second information recording layer is focused with high reproduction laser power accidentally and thereby rendered unreadable irreversibly. Furthermore, the medium information may be recorded in a form of a barcode indicative of the medium information in the vicinity of an internal opening of the optical information storage medium 100.

Alternatively, medium determination means for judging medium information may be used before the spindle motor 20 rotates the optical information storage medium 100. For example, the medium information is mechanically identified according to a part of the optical information storage medium 100, a cutout of a part of a cartridge housing the optical information storage medium 100, or the like.

In a case where it is judged, in accordance with the medium information and any of the above methods, that the optical information storage medium 100 is the double-layer super resolution optical information storage medium 100a, the optical information storage medium reproduction apparatus 10 performs the reproduction with reproduction laser power for the double-layer super resolution optical information storage medium 100a. At this time, the optical information storage medium reproduction apparatus 10 reads out other information (i.e., address information and the after-mentioned minimum reproduction laser power Pr1 min for the first information recording layer) related to the super resolution optical information storage medium. The other information related to the super resolution optical information storage medium can be read even when the other information is recorded in the form of patterns including a pattern having a recording mark length not longer than the resolution limit of the optical information storage medium reproduction apparatus 10. This makes it possible to increase density of information including the other information related to the super resolution optical information storage medium. Moreover, the medium determination means may be able to judge information on the after-mentioned reproduction laser power Pr1 for the first information recording layer and the after-mentioned reproduction laser power Pr2 for the second information recording layer.

In this case, it is preferable that the playback of the double-layer super resolution optical information storage medium start from the first information recording layer. This can prevent such a problem that the first information recording layer is accidentally read with the reproduction laser power Pr2 for the second information recording layer, which is high reproduction laser power, at the start of the reproduction and thereby the first information recording layer is rendered unreadable irreversibly.

It should be noted that, to start the reproduction in the order from the first information recording layer is preferable only in the case of the double-layer super resolution optical information storage medium. This is not true for an n-layer super resolution optical information storage medium in which n is at least 3.

EXAMPLES

Optical Information Storage Medium

The following deals with a super resolution optical information storage medium 100a and a normal optical information storage medium 100b, which are reproduced by the optical information storage medium reproduction apparatus 10 according to the present embodiment.

One example of a conventional double-layer optical information storage medium is a double-layer optical information storage medium 100c of Reference Example 1, having a structure illustrated in FIG. 3.

Reference Example 1

The following describes, with reference to FIG. 3, a case where a conventional optical information storage medium reproduction apparatus plays a conventional double-layer optical information storage medium. As one exemplary case where the optical information storage medium reproduction apparatus plays such an optical information storage medium, Reference Example 1 deals with a case where the double-layer optical information storage medium 100c, which is a conventional optical information storage medium including 2 information recording layers, is reproduced. As illustrate in FIG. 3, the double-layer optical information storage medium 100c includes a light-transmitting layer 101c, a first information recording layer 102c, an intermediate layer 103c, a second information recording layer 104c, and a substrate 105, which are laminated in this order from a reproduction-laser-incident surface.

The light-transmitting layer 101c is formed of a transparent resin layer (film thickness: 75 μm), the first information recording layer 102c is formed of a translucent reflection film (Au, film thickness: 15 nm), the intermediate layer 103c is formed of a transparent ultraviolet-curing resin layer (film thickness: 25 μm), the second information recording layer 104c is formed of a reflection film (Au, film thickness: 50 nm), and the substrate 105c is formed of a resin substrate.

On the intermediate layer 103c and the substrate 105c of the double-layer optical information storage medium 100c to be reproduced by the optical information storage medium reproduction apparatus of Reference Example 1, prepits (not shown) are formed each in the form of a concavity and/or a convexity. By laminating the translucent reflection film and the reflection film on the prepits of the intermediate layer 103c and the substrate 105c, respectively, the concavities/convexities are transferred onto the translucent reflection film and the reflection film. Consequently, the prepits are formed as recording marks on the first information recording layer 102c and the second information recording layer 104c.

That is, the double-layer optical information storage medium 100c is a so-called read-only optical information storage medium. Further, the prepits, that is, the recording marks, of the double-layer optical information storage medium 100c of Reference Example 1 are formed in a form of recording patterns based on a 1-7PP modulation method adopted by Blu-ray Disc (registered trademark), in which 2T mark length, which is a shortest recording mark length, is 149 nm. Here, T indicates a time equivalent to one period of a clock.

Reproduction-laser-power dependence of jitter of each of the first information recording layer 102c and the second information recording layer 104c in the double-layer optical information storage medium 100c of Reference Example 1 is measured by use of a disk measurement device which includes a semiconductor laser that irradiates light having a wavelength of 405 nm, which is a wavelength of blue laser light, and an optical system including a numerical aperture NA of 0.85. The result of the measurement is shown in FIG. 4.

The jitter is an index indicative of fluctuation in reproduction signal in a time axis direction. As a value of the jitter becomes smaller, the jitter indicates a better reproduction signal characteristic. Generally, the jitter is often used to show a reproduction signal characteristic of a medium.

Figure 4:
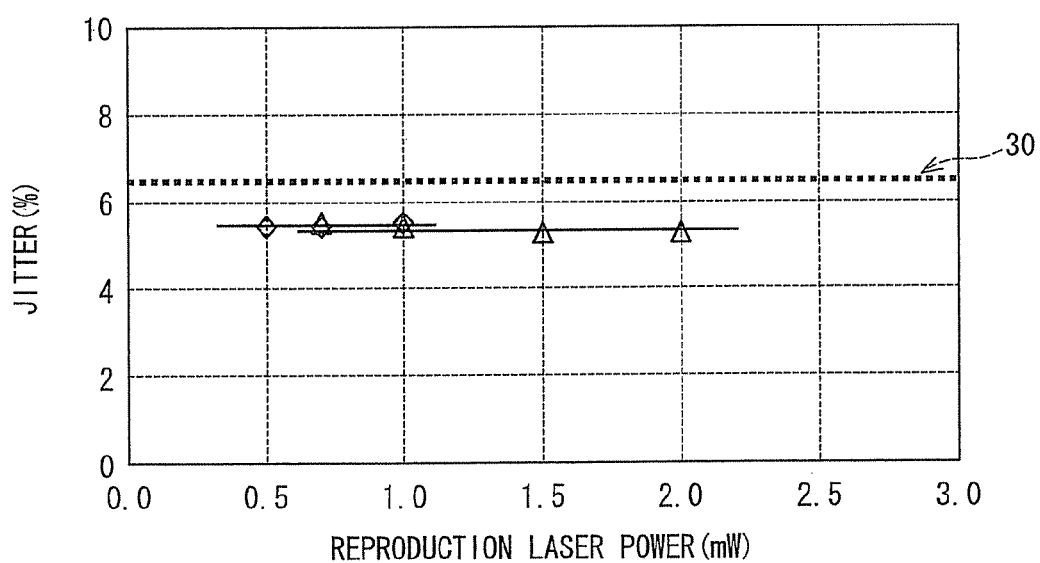
FIG. 4

Further, a threshold 30 shown by a bold dotted line in FIG. 4 is a threshold of a jitter value at which, in general, the optical information storage medium reproduction apparatus can stably read information stored in the optical information storage medium 100, i.e., a threshold of the jitter necessary for the optical information storage medium reproduction apparatus to stably reproduce the optical information storage medium 100.

As shown in FIG. 4, respective jitters of the first information recording layer 102c and the second information recording layer 104c in the double-layer optical information storage medium 100c are not dependent on reproduction laser power, and are substantially constant and not more than the threshold 30. The reproduction laser power of the optical information storage medium reproduction apparatus may take any value as long as the reproduction laser power causes the jitter value to be not more than the threshold 30. On this account, the double-layer optical information storage medium 100c exhibiting such a reproduction signal characteristic shown in Reference Example 1 can select, from among a wide range of laser power, respective values for reproduction laser power for the first information recording layer 102c and reproduction laser power for the second information recording layer 104c.

(Reproduction Laser Power in Conventional Optical Information Storage Medium Reproduction Apparatus)

In the conventional optical information storage medium reproduction apparatus, reproduction laser power for reading the first information recording layer 102c and reproduction laser power for reading the second information recording layer 104c are set to the same value. For example, in FIG. 4, a value of 0.7 mW or the like value can be employed as the reproduction laser power for each of the first information recording layer 102c and the second information recording layer 104c.

One of the reasons for this is as below. If the reproduction laser power for reading the first information recording layer 102c and the reproduction laser power for reading the second information recording layer 104c are set to values different from each other, control of the reproduction laser power by APC (automatic power control) or the like becomes complicated, and it becomes difficult for the optical information storage medium reproduction apparatus to read the first information recording layer 102c and the second information recording layer 104c at the same reproduction circuit.

For this reason, in the conventional optical information storage medium reproduction apparatus for reproducing the double-layer optical information storage medium 100c, the reproduction laser power for reading the first information recording layer and the reproduction laser power for reading the second information recording layer are set to the same value.

The inventor(s) of the present invention evaluated the reproduction signal characteristic according to the difference in laser power on the basis of indices, such as CNR, jitter, and bER, by use of a multilayer super resolution optical information storage medium, and found the following fact. That is, reading of a first information recording layer of the multilayer super resolution optical information storage medium with reproduction laser power equivalent to that for reading a second information recording layer thereof damages the first information recording layer, similarly to the conventional and practical optical information storage medium reproduction apparatus for reproducing a double-layer optical information storage medium.

[Double-Layer Super Resolution Optical Information Storage Medium]

The multilayer super resolution optical information storage medium will be explained below more specifically, by taking, as one example, a disk #1 and a disk #2, each of which is a double-layer super resolution optical information storage medium. Structures of the disks #1 and #2 are explained with reference to the structure of FIG. 3, similarly to Reference Example 1.

[Disk #1]

A double-layer super resolution optical information storage medium 100d as the disk #1 includes a light-transmitting layer 101d, a first information recording layer 102d, an intermediate layer 103d, a second information recording layer 104d, and a substrate 105d, which are laminated in this order from a reproduction-laser-incident surface.

The light-transmitting layer 101d is formed of a transparent resin layer (film thickness: 75 μm), the first information recording layer 102d is formed of a temperature-sensitive layer (zinc oxide, film thickness: 60 nm) and a light-absorbing layer (Ta, film thickness: 7.5 nm), the intermediate layer 103d is formed of a transparent ultraviolet-curing resin layer (film thickness: 25 μm), the second information recording layer 104d is formed of a temperature-sensitive layer (zinc oxide, film thickness: 60 nm) and a light-absorbing layer (Ta, film thickness: 15 nm), and the substrate 105d is formed of a resin substrate. A super resolution technique adopted by the double-layer super resolution optical information storage medium 100d is based on the technique disclosed in Patent Literature 3.

[Disk #2]

A double-layer super resolution optical information storage medium 100e as the disk #2 includes a light-transmitting layer 101e, a first information recording layer 102e, an intermediate layer 103e, a second information recording layer 104e, and a substrate 105e, which are laminated in this order from a reproduction-laser-incident surface.

The light-transmitting layer 101e is formed of a transparent resin layer (film thickness: 75 μm), the first information recording layer 102e is formed of a functional layer (Si, film thickness: 5 nm), the intermediate layer 103e is formed of a transparent ultraviolet-curing resin layer (film thickness: 25 μm), the second information recording layer 104e is formed of a functional layer (Si, film thickness: 50 nm), and the substrate 105e is formed of a resin substrate. A super resolution technique adopted by the double-layer super resolution optical information storage medium 100e is the technique disclosed in Patent Literature 2.

Comparative Examples 1 and 2

Optical information storage media each having the following properties were reproduced by the optical information storage medium reproduction apparatus 10, for comparison. A result of the reproduction is described as below. The optical information storage media reproduced here are optical information storage media that can be reproduced without any of the super resolution techniques, and were reproduced just for comparison to prove that the double-layer super resolution optical information storage media 100d and 100e have a super resolution characteristic.

The optical information storage media reproduced in Comparative Examples 1 and 2 each include a light-transmitting layer, an information recording layer, and a substrate, which are laminated in this order from a reproduction-laser-incident surface.

The light-transmitting layer is formed of a transparent resin layer (film thickness: 100 μm), the information recording layer is formed of a reflection film (Au, film thickness: 50 nm for Comparative Example 1, 20 nm for Comparative Example 2), and the substrate is formed of a resin substrate.

On each of the intermediate layer 103d and the substrate 105d of the double-layer super resolution optical information storage medium 100d as the disk #1, each of the intermediate layer 103e and the substrate 105e of the double-layer super resolution optical information storage medium 100e as the disk #2, and each of the substrates of Comparative Examples 1 and 2, prepits each made up in the form of a concavity and/or a convexity are formed.

For the disk #1, the temperature-sensitive layer and the light-absorbing layer are laminated on the prepits, thereby transferring the concavities/convexities to the light-absorbing layer. Thus, the prepits are formed on the light-absorbing layer as recording marks.

Similarly, for the disk #2, the functional layer is laminated on the prepits, thereby transferring the concavities/convexities to the functional layer. Thus, the prepits are formed on the functional layer as recording marks. Further, for Comparative Examples 1 and 2, the reflection film is laminated on the prepits, thereby transferring the concavities/convexities on the reflection film. Thus, the prepits are formed on the reflection film as recording marks.

In view of this, the double-layer super resolution optical information storage medium 100d, the optical information storage medium in Comparative Example 1, the double-layer super resolution optical information storage medium 100e, and the optical information storage medium in Comparative Example 2 are a so-called read-only optical information storage medium.

The prepits, i.e., the recording marks on the double-layer super resolution optical information storage medium 100d and the optical information storage medium in Comparative Example 1 are formed in a recording pattern based on the 1-7PP modulation method adopted by the Blu-ray Disc (registered trademark). A 2T mark length, which is the shortest recording mark length, is 93 nm. The 1-7PP modulation method is called a random pattern method in which a plurality of recording marks having different lengths are aligned in a signal-reading direction in a regular manner according to a predetermined method.

The prepits, i.e., the recording marks on the double-layer super resolution optical information storage medium 100e and the optical information storage medium of Comparative Example 2 are formed in a single-frequency repeating pattern in which a recording mark length is 100 nm. The single-frequency repeating pattern method is called a monotone pattern method in which a mark space ratio is 1:1.

(Measurement of Reproduction Signal Characteristic)

A reproduction signal characteristic of each of the double-layer super resolution optical information storage media 100d and 100e, and the normal optical information storage media in Comparative Examples 1 and 2 was measured by use of a disk measurement device at the time of reproducing these media. Results of the measurement are as follows.

(Measurement of Disk #1)

Figure 5:
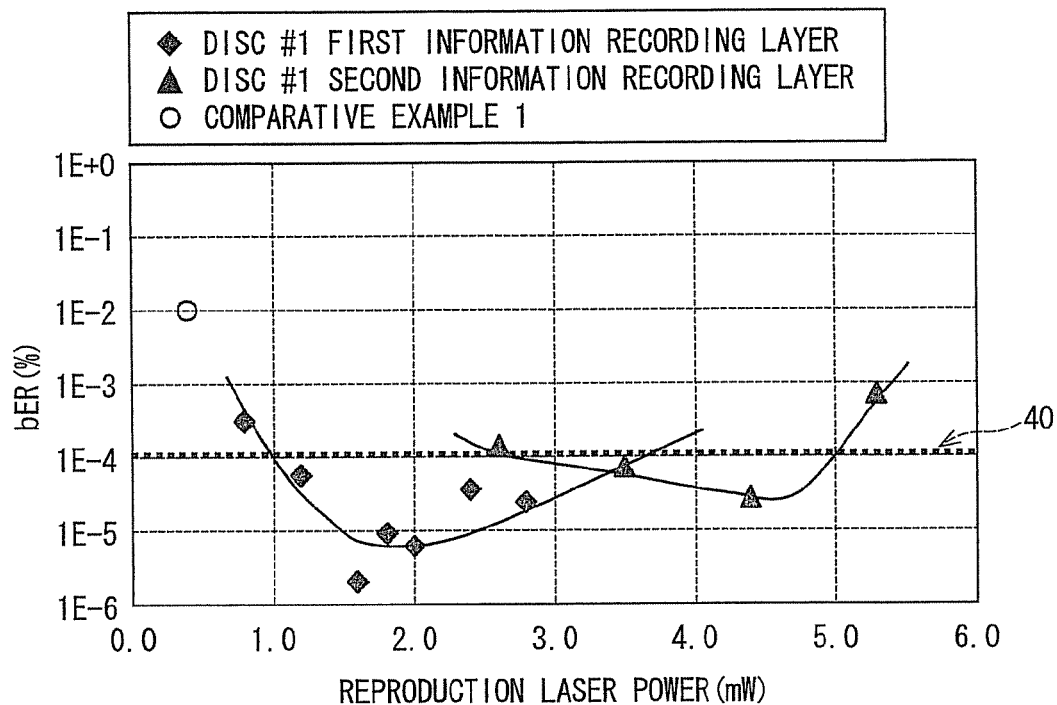
FIG. 5

FIG. 5 is a graph showing reproduction-laser-power dependence of bER (bit Error Rate) measured at the time of reading of (i) the first information recording layer 102d, (ii) the second information recording layer 104d, each in the double-layer super resolution optical information storage medium 100d as the disk #1, and (iii) the information recording layer in the normal optical information storage medium of Comparative Example 1. The measurement was carried out with the use of a disk measurement device which includes a semiconductor laser that irradiates light having a wavelength of 405 nm, which is a wavelength of blue laser light, and an optical system having a numerical aperture NA of 0.85.

The optical system is the same as one for use in a Blu-ray Disc (registered trademark) reproduction apparatus. As described above, the resolution limit is represented by $\lambda/(4NA)$. Accordingly, a resolution limit of the disk measurement device is about 120 nm. On this account, the shortest recording mark length, 93 nm, of the double-layer super resolution optical information storage medium 100d and 3 is not longer than the resolution limit of the optical system of the disk measurement device.

Moreover, the bER indicates a bit error ratio of a reproduction signal. This is one of indices that represent the reproduction signal characteristic of a medium. As a value of the bER is smaller, the reproduction signal characteristic becomes better.

When the shortest recording mark length is not longer than the resolution limit, a value of jitter, which is generally used as the index that represents the reproduction signal characteristic, worsens markedly. As a result, the jitter cannot serve as the index. In this case, it is difficult to evaluate the reproduction signal characteristic based on the value of the jitter.

When the jitter takes a moderate value, the bER takes an adequate value. However, in some cases, even if the jitter does not take a moderate value, the bER still may take an adequate value. The bER is an evaluation index value eventually necessary for a practical optical information storage medium reproduction apparatus. If the bER is adequate, a system itself works out. For this reason, the bER was also used in this measurement as one of the indices that represent the reproduction signal characteristic of a medium.

A threshold 40 shown by a bold dotted line in FIG. 5 is a threshold of the bER at which, in general, an optical information storage medium reproduction apparatus can stably read information recorded in an optical information storage medium. In other words, the threshold 40 is a threshold of the reproduction signal characteristic that a general optical information storage medium reproduction apparatus requires. As shown in FIG. 5, respective values of the bER that were measured at the time of the reading of the first information recording layer 102d and the second information recording layer 104d in the double-layer super resolution optical information storage medium 100d are sufficiently smaller than the value of the bER that is measured at the time of the reading of the information recording layer in the optical information storage medium in Comparative Example 1

Further, as apparent from FIG. 5, respective ranges of reproduction laser power that cause the respective values of the bER, measured at the time of the reading of the first information recording layer 102d and the second information recording layer 104d in the double-layer super resolution optical information storage medium 100d, to be not more than the threshold 40 are different from each other. More specifically, for the first information recording layer 102d, the range of reproduction laser power is from 1.0 mW to 3.7 mW, and for the second information recording layer 104d, the range of reproduction laser power is 2.7 mW to 5.0 mW.

From the measurement results, it is demonstrated that the range of reproduction laser power of the first information recording layer 102d is lower than that of the second information recording layer 104d. Moreover, it is also demonstrated that, on an axis of the reproduction laser power, the range of reproduction laser power of the first information recording layer 102d is placed on a side where the reproduction laser power is relatively small, as compared to the second information recording layer 104d.

In the double-layer super resolution optical information storage medium, the second information recording layer 104d is read definitely with reproduction light that passes through the first information recording layer 102d. Therefore, an amount of the laser light that reaches the second information recording layer 104d is reduced. For this reason, reproduction laser power necessary for reading the second information recording layer 104d should be higher than that necessary for the first information recording layer 102d.

Further, similarly to the conventional optical information storage medium reproduction apparatus, there exists a value (for example, 2.8 mW in FIG. 5) of the reproduction laser power that allows respective values of the bER of the first information recording layer 102d and the second information recording layer 104d to be not more than the threshold 40.

(Measurement of Disk #2)

Figure 6:
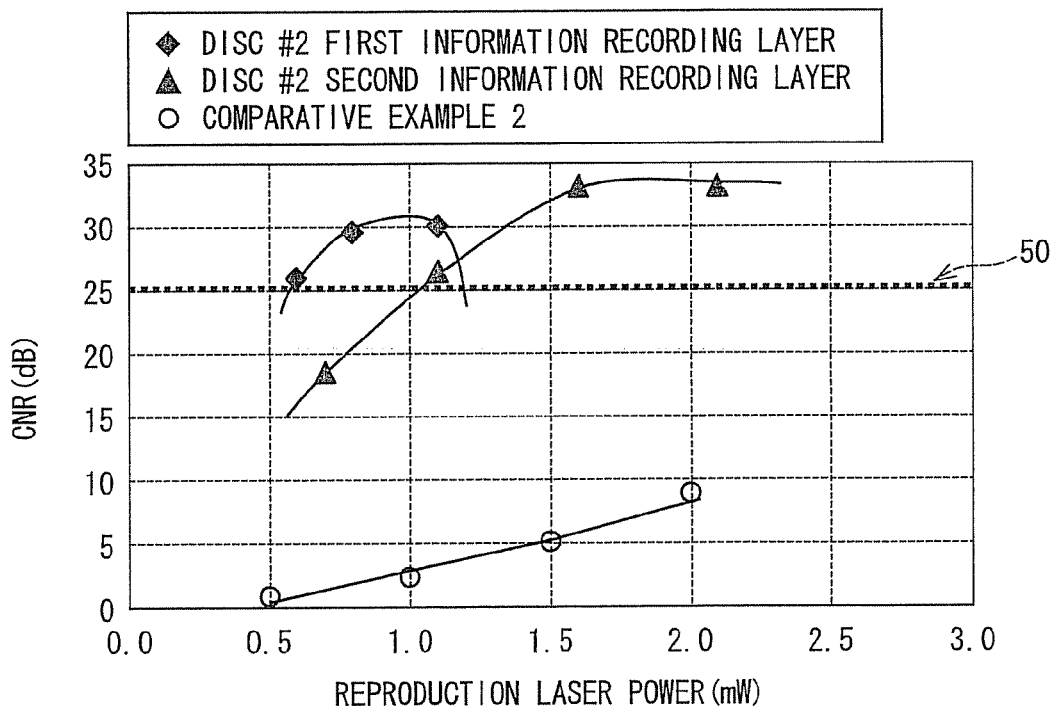
FIG. 6

FIG. 6 is graphs showing reproduction-laser-power dependence of CNR (Carrier to Noise Ratio) measured at the time of reading (i) the first information recording layer 102e, (ii) the second information recording layer 104e, each in the double-layer super resolution optical information storage medium 100e as the disk #2, and (iii) the information recording layer in the optical information storage medium of Comparative Example 2. The measurement was carried out with the use of the same disk measurement device as the one used for the measurement of the double-layer super resolution optical information storage medium 100d, i.e., the disk measurement device which includes a semiconductor laser that irradiates light having a wavelength of 405 nm, which is a wavelength of blue laser light, and an optical system having a numerical aperture NA of 0.85.

As has been already described, the resolution limit is represented by $\mu/(4NA)$. Accordingly, a resolution limit of the disk measurement device is around 120 nm. On this account, the recording mark length, 100 nm, of the double-layer super resolution optical information storage medium 100e and the optical information storage medium of Comparative Example 2 is not longer than the resolution limit of the disk measurement device.

The CNR is one of evaluation indices for a single-frequency repeating signal in a case where the recording marks are formed by the monotone method, and is one of the indices representing the reproduction signal characteristic of a medium. As a value of the CNR becomes larger, the reproduction signal characteristic becomes better.

As the evaluation index for a single-frequency repeating signal, not the jitter nor the bER, but the CNR is generally used. For this reason, in this measurement, the CNR was employed as the index representing the reproduction signal characteristic of a medium.

A threshold 50 shown by a bold dotted line in FIG. 6 is a threshold of the CNR at which, in general, an optical information storage medium reproduction apparatus can stably read information stored in an optical information storage medium. That is, the threshold 50 is a threshold of the reproduction signal characteristic that a general optical information storage medium reproduction apparatus requires.

As shown in FIG. 6, respective values of the CNR of the first information recording layer 102e and the second information recording layer 104e in the double-layer super resolution optical information storage medium 100e are sufficiently larger than that of the information recording layer of the optical information storage medium of Comparative Example 2.

Further, as apparent from FIG. 6, respective ranges of reproduction laser power that cause the respective values of the CNR of the first information recording layer 102e and the second information recording layer 104e in the double-layer super resolution optical information storage medium 100e to be not less than the threshold 50 are different from each other. More specifically, for the first information recording layer 102e, the range of reproduction laser power is 0.6 mW to 1.2 mW, and for the second information recording layer 104e, the range of reproduction laser power is not less than 1.1 mW.

From the measurement results, the inventor(s) of the present invention found that, in the double-layer super resolution optical information storage medium 100e, the range of reproduction laser power of the first information recording layer 102e is lower than that of the second information recording layer 104e. Moreover, it is also found out that, on an axis of the reproduction laser power, the range of reproduction laser power of the first information recording layer 102e is placed on a side where the reproduction laser power is relatively small, as compared to the second information recording layer 104e.

Further, similarly to the conventional optical information storage medium reproduction apparatus, there exists a value (for example, 1.1 mW in FIG. 6) of the reproduction laser power that allows respective values of the CNR of the first information recording layer 102e and the second information recording layer 104e to be not less than the threshold 50.

Further, the inventor(s) of the present invention also found the following fact. That is, similarly to the conventional optical information storage medium reproduction apparatus, if the first information recording layer 102d and the second information recording layer 104d in the double-layer super resolution optical information storage medium 100d are read with the same reproduction laser power, the first information recording layer 102d is damaged during the reading, thereby causing such a problem that information stored in the first information recording layer 102e is rendered unreadable. This problem also happens to the double-layer super resolution optical information storage medium 100e.

For the double-layer super resolution optical information storage medium 100d, the same reproduction laser power means, for example, 3.0 mW, at which the respective values of the bER of the first information recording layer 102d and the second information recording layer 104d during the reproduction are not more than the threshold. For the double-layer super resolution optical information storage medium 100d, the same reproduction laser power means, for example, 1.1 mW, at which the respective values of the CNR of the first information recording layer 102e and the second information recording layer 104e are not less than the threshold.

(Number of Reproduction Times)

FIG. 7 is a graph showing a correlation between the number of reproduction times and normalized reflectance at the time when the first information recording layer 102d of the double-layer super resolution optical information storage medium 100d is read with predetermined reproduction laser power. FIG. 7 shows reproduction-time dependence of normalized reflectance of a maximum return-light amount of a reproduction signal, measured at the time when the first information recording layer 102d of the double-layer super resolution optical information storage medium 100d is read with reproduction laser power of 1.2 mW, 1.6 mW, 2.0 mW, and 2.8 mW. The normalized reflectance indicates reflectance obtained by normalizing reflectance at a certain number of reproduction times, based on reflectance at the time when the reproduction is performed once. For example, when the number of reproduction times is 1, the normalized reflectance is 1.0.

As apparent from FIG. 7, as the reproduction laser power increases, an amount of change in the normalized reflectance increases along with an increase in the number of reproduction times. This means that the characteristic becomes worse. For example, in a case where the reproduction laser power is 2.8 mW and the reproduction is performed 2000 times, an occurrence ratio of the change in reflectance increases to at least 50%.

Generally, for the reproduction of an optical information storage medium, there may be such a case where an optical pickup temporarily stops on a certain track of the optical information storage medium due to a pause until the next reproduction command is inputted. Therefore, in order that stable reproduction is realized, the optical information storage medium should have reproduction resistance that allows the optical information storage medium to be reproduced at least 2000 times.

Further, a large change in reflectance may cause poor focus. Furthermore, the large change in reflectance may cause reproduction signal amplitude to exceed its necessary range for reading information stored in the optical information storage medium, thereby making it difficult to read the information. In view of this, in order that the optical information storage medium is stably reproduced, it is necessary to restrain the occurrence ratio of the change in reflectance to 10% to 20%, in general.

In the case where the first information recording layer 102d of the double-layer super resolution optical information storage medium 100d is read 2000 times with reproduction laser power of 2.8 mW, the necessary reproduction resistance and the change characteristic in reflectance are not satisfied. For this reason, it is substantially impossible to employ the reproduction laser power of 2.8 mW for the reproduction of the double-layer super resolution optical information storage medium 100d.

Further, it is also demonstrated, in the measurement results, that in a case where the first information recording layer 102d of the double-layer super resolution optical information storage medium 100d is read with reproduction laser power of not more than 2.0 mW, the bER does not exceed its threshold even after the reproduction is performed 2000 times. On the other hand, it is demonstrated that in the case where the reproduction is performed 2000 times with reproduction laser power of 2.8 mW, the value of the bER significantly increases and exceeds the threshold irreversibly. That is, as the reproduction laser power increases, the bER becomes worse along with an increase in the number of reproduction times. From the viewpoint of the bER characteristic, it is substantially impossible to employ the reproduction laser power of 2.8 mW for the reading of the first information recording layer 102d of the double-layer super resolution optical information storage medium 100d.

Meanwhile, the second information recording layer 104d is read definitely with a reproduction laser that has passed through the first information recording layer 102d. That is, at the time when an irradiated reproduction laser reaches the second information recording layer 104d, the reproduction laser power of the irradiated reproduction laser has decreased. On this account, even in a case where the reproduction laser power is set to 2.8 mW, at the time when the reproduction laser reaches the second information recording layer 104d, the reproduction laser power is less than 2.8 mW. This allows the reflectance and the bER of the second information recording layer 104d to be stable.

For this reason, unlike the conventional optical information storage medium reproduction apparatus, it is practically difficult to read, with the same reproduction power, the first information recording layer 102d and the second information recording layer 104d of the double-layer super resolution optical information storage medium 100d.

Furthermore, similarly to the double-layer super resolution optical information storage medium 100d, it is demonstrated that in a case where the first information recording layer 102e of the double-layer super resolution optical information storage medium 100e is read with reproduction laser power of 1.1 mW, the reflectance decreases as the number of reproduction times increases, thereby decreasing a characteristic of the first information recording layer 102e. This ultimately causes the first information recording layer 102e to be unreadable.

For this reason, unlike the conventional optical information storage medium reproduction apparatus, it is practically difficult to read, with the same reproduction power, the first information recording layer 102e and the second information recording layer 104e of the double-layer super resolution optical information storage medium 100e as the disk #2.

As described in the above [Background Art], the super resolution techniques generally require high reproduction laser power. Further, the second information recording layer 104e is read definitely with reproduction light that has passed the first information recording layer 102e. Therefore, an amount of laser light that actually reaches the second information recording layer 104e has decreased. As a result, conditions of a necessary temperature and light amount necessary for super resolution reproduction are not satisfied. That is, the super resolution reproduction of the second information recording layer 104e requires reproduction laser power higher than power necessary for the first information recording layer 102e.

(Reproduction Laser Power for Reading First Information Recording Layer)

The following describes reproduction laser power at the time when the optical information storage medium reproduction apparatus 10 reproduces a multilayer super resolution optical information storage medium in which n pieces of information recording layers are laminated. An information recording layer that is nth from a reproduction-laser-incident surface side of the multilayer super resolution optical information storage medium is referred to as the nth information recording layer. The reproduction laser power explained below is reproduction laser power Pr1 for the first information recording layer and reproduction laser power Prn for the nth information recording layer. That is, the following deals with, as an example, a case where the double-layer super resolution optical information storage medium 100d is reproduced. More specifically, the following describes reproduction laser power Pr2 for a second information recording layer where n = 2.

The reproduction laser power Pr1 for the first information recording layer is reproduction laser power that is set when the optical information storage medium reproduction apparatus 10 reads the first information recording layer 102d. Further, the reproduction laser power Pr2 for the second information recording layer is reproduction laser power that is set when the optical information storage medium reproduction apparatus 10 reads the second information recording layer 104d.

Here, minimum reproduction laser power that satisfies a reproduction signal characteristic that the optical information storage medium reproduction apparatus 10 requires at the time of the reading of the first information recording layer 102d is referred to as minimum reproduction laser power Pr1 min for the first information recording layer. For example, in FIG. 5, reproduction laser power that causes bER measured at the time of the reading of the first information recording layer 102d to be not more than the threshold 40 is in a range from 1.0 mW to 3.7 mW. That is, the minimum reproduction laser power Pr1 min for the first information recording layer can be set to 1.0 mW.

The reproduction laser power Pr2 for the second information recording layer may be set to any value within a reproduction laser power range which satisfies the reproduction signal characteristic that the optical information storage medium reproduction apparatus 10 requires at the time of the reading of the second information recording layer 104d. For example, in FIG. 5, reproduction laser power that causes bER measured at the time of the reading of the second information recording layer 104d to be not more than the threshold 40 is in a range from 2.7 mW to 5.0 mW. The reproduction laser power Pr2 for the second information recording layer can be set to any value within the range.

It should be noted that, the lower a value of the reproduction laser power Pr2 for the second information recording layer is within the aforementioned laser power range, the more the power consumption of the laser can be restrained. On this account, as shown in FIG. 5, in a case of a reproduction signal characteristic that is obtained at the time when the reproduction laser power that causes the bER measured at the time of the reading of the second information recording layer 104d to be not more than the threshold 40 is within the range of 2.7 mW to 5.0 mW, it is preferable to set the reproduction laser power Pr2 for the second information recording layer to 2.7 mW.

How to determine the reproduction laser power Pr2 for the second information recording layer is not especially limited in any manner. For example, before the reproduction of the double-layer super resolution optical information storage medium 100d starts, the reproduction laser power Pr2 for the second information recording layer may be set with the use of means for identifying information related to settings of the reproduction laser power Pr2 for the second information recording layer. The above means identifies the information before the spindle motor 20 rotates the optical information storage medium 100 (for example, in such a manner that a cutout or the like formed in a part of a disk or a part of a cartridge housing the disk, is recognized mechanically).

Further, in a case where the information related to the settings of the reproduction laser power Pr2 for the second information recording layer is recorded in the form of recording marks having a length not shorter than the resolution limit of the optical information storage medium reproduction apparatus 10, the information may be read out first with low reproduction laser power used for the normal double-layer optical information storage medium 100c or the like, followed by setting the reproduction laser power Pr2 for the second information recording layer. Alternatively, the reproduction laser power Pr2 for the second information recording layer may be set by test reading with the use of a test read region that is formed in advance in the double-layer super resolution optical information storage medium 100d. That is, the reproduction laser power may be caused to rise and fall so as to measure reproduction laser power dependence of the reproduction signal characteristic, and the reproduction laser power Pr2 for the second information recording layer may be set, accordingly, so that its value is selected from within a range of the reproduction laser power.

Here, the reproduction laser power Pr1 for the first information recording layer is not lower than the minimum reproduction laser power Pr1 min for the first information recording layer but lower than the reproduction laser power Pr2 for the second information recording layer. A relationship among (a) the reproduction laser power Pr1 for the first information recording layer, (b) the reproduction laser power Pr2 for the second information recording layer, and (c) the minimum reproduction laser power Pr1 min for the first information recording layer satisfies the following expression (1):

$$Pr1\ \min \leq Pr1 < Pr2 \tag{1}$$

One of the reasons why the reproduction laser power Pr1 for the first information recording layer should be lower than the reproduction laser power Pr2 for the second information recording layer is as follows. As described above in "Reproduction Laser Power in Conventional Optical Information Storage Medium Reproduction Apparatus", in the conventional optical information storage medium reproduction apparatus 10, the reproduction laser power Pr1 for the first information recording layer and the reproduction laser power Pr2 for the second information recording layer are set to the same value. However, for the reading of the first information recording layer 102d of the double-layer super resolution optical information storage medium 100d, if the reproduction laser power Pr1 for the first information recording layer is equal to or higher than the reproduction laser power Pr2 for the second information recording layer, this may cause the first information recording layer 102d to be unreadable. Further, in a case where the reproduction laser power Pr1 for the first information recording layer is lower than the minimum reproduction laser power Pr1 min for the first information recording layer, the reproduction signal characteristic that the optical information storage medium reproduction apparatus 10 requires cannot be satisfied at the time of reading the first information recording layer 102d. In this case, it is difficult to read the first information recording layer 102d. For this reason, it is necessary that the reproduction laser power Pr1 for the first information recording layer should be not lower than the minimum reproduction laser power Pr1 min for the first information recording layer.

Further, a reproduction laser power range of the reproduction laser power Pr1 for the first information recording layer further preferably satisfies the following expression (2):

$$1.05 \times Pr1\ \min \leq Pr1 \leq 0.95 \times Pr2 \tag{2}$$

One of the reasons is as follows. In general, there may occur production variability between individual lasers and assembling variability between individual optical systems in the course of producing optical information storage medium reproduction apparatuses, production variability between individual optical information storage media, environmental differences at the time of reproduction, and the like. In view of this, a reproduction laser power margin, which is a reproduction laser power range for a practical reproduction signal characteristic, is necessary for a reproduction system. That is, the reproduction laser power margin indicates an allowable range within which the reproduction laser power may vary.

Generally, an amount of the reproduction laser power margin becomes smaller, as accuracy of an optical pickup of the optical system of the optical information storage medium reproduction apparatus becomes higher, for example. However, since there is variability between individual media, it is necessary that the reproduction laser power margin have at least 5% latitude. In view of this, the reproduction laser power Pr1 for the first information recording layer is set such that each of an upper limit and a lower limit of the reproduction laser power Pr1 has a 5% reproduction laser power margin with respect to the range represented by the expression (1) of the reproduction laser power Pr1 for the first information recording layer. That is, the reproduction laser power Pr1 for the first information recording layer is set so as to satisfy the relationship represented by the expression (2). This makes it possible to prevent that the reading of the first information recording layer 102d of the double-layer super resolution optical information storage medium 100d is affected by various factors, such as production variability between individual light sources for use in individual optical information storage medium reproduction apparatuses 10, assembling variability between individual optical systems for use in individual optical information storage medium reproduction apparatuses 10, production variability between individual double-layer super resolution optical information storage media 100d, and environmental differences at the time of reproduction.

As a result, it is possible that the reproduction signal characteristic necessary for the optical information storage medium reproduction apparatus 10 is satisfied. Besides, the changes in the reflectance and the reproduction signal characteristic, which are caused along with an increase in the number of reproduction times, occur little as compared to the conventional optical information storage medium reproduction apparatus. Consequently, the first information recording layer 102d can be read stably.

How to determine the minimum reproduction laser power Pr1 min for the first information recording layer is not limited in any particular manner, similarly to the reproduction laser power Pr2 for the second information recording layer. The minimum reproduction laser power Pr1 min for the first information recording layer may be determined in the same manner as the reproduction laser power Pr2 for the second information recording layer, as described above. However, in a case where the minimum reproduction laser power Pr1 min for the first information recording layer is determined according to the test reading, the minimum reproduction laser power Pr1 min for the first information recording layer is set to a certain value by reflecting a result of the test reading, differently from the reproduction laser power Pr2 for the second information recording layer.

How to determine the reproduction laser power Pr1 for the first information recording layer is also not limited in any particular manner. However, it is necessary that the reproduction laser power Pr1 be within the reproduction laser power range represented by the expression (1), more preferably, the reproduction laser power range represented by the expression (2), each defined by the minimum reproduction laser power Pr1 min for the first information recording layer and the reproduction laser power Pr2 for the second information recording layer.

(Movement Between Layers)

Next will be explained about the reproduction laser power Pr1 for the first information recording layer and the reproduction laser power Prn for the nth information recording layer at the time when the optical information storage medium reproduction apparatus moves focus (hereinafter also referred to as "focus movement between layers") from the first information recording layer to the nth information recording layer and vice versa during reproduction of a multilayer super resolution optical information storage medium. The following deals with a case, as an example, where the double-layer super resolution optical information storage medium 100d is reproduced, i.e., a case where n=2.

At the time when the focus is moved (focus movement between layers) from the first information recording layer 102d to the second information recording layer 104d or from the second information recording layer 104d to the first information recording layer 102d, it is preferable that the reproduction laser power be lower than the reproduction laser power Pr2 for the second information recording layer.

In a case where the reproduction laser power is not lower than the reproduction laser power Pr2 for the second information recording layer at the time when the focus is moved from the first information recording layer 102d to the second information recording layer 104d or from the second information recording layer 104d to the first information recording layer 102d (that is, at the time of focus movement between layers), the focus on the first information recording layer 102d with such high reproduction laser power may cause the first information recording layer 102d to be unreadable irreversibly due to the high reproduction laser power. In contrast, in a case where the reproduction laser power is lower than the reproduction laser power Pr2 for the second information recording layer, it is possible to prevent the above problem in which the first information recording layer 102d is rendered unreadable irreversibly.

Further, it is more preferable that the reproduction laser power used at the time when the focus is moved from the first information recording layer 102d to the second information recording layer 104d or from the second information recording layer 104d to the first information recording layer 102d (i.e., at the time of focus movement between layers) be the reproduction laser power Pr1 for the first information recording layer. One of the reasons is as follows.

Assume that Prx is reproduction laser power which is lower than the reproduction laser power Pr2 for the second information recording layer but which is not the reproduction laser power Pr1 for the first information recording layer. Prx is taken as reproduction laser power at the time when the focus is moved from the first information recording layer 102d to the second information recording layer 104d or from the second information recording layer 104d to the first information recording layer 102d (at the time of focus movement between layers).

In this case, the reproduction laser power Prx is different from the reproduction laser power Pr1 for the first information recording layer and the reproduction laser power Pr2 for the second information recording layer. Therefore, it is necessary that the reproduction laser power be once set to Prx before it is changed from the reproduction laser power Pr1 for the first information recording layer to the reproduction laser power Pr2 for the second information recording layer and vice versa. This causes time loss because one focus movement between layers requires two changes in laser power. Further, if Prx is largely different from the reproduction laser power Pr1 for the first information recording layer and the reproduction laser power Pr2 for the second information recording layer, this may causes such a problem that the focus on each of the information recording layers may become poor.

In view of this, if the reproduction laser power is set to the reproduction laser power Pr1 for the first information recording layer at the time when the focus is moved from the first information recording layer 102d to the second information recording layer 104d or from the second information recording layer 104d to the first information recording layer 102d (at the time of focus movement between layers), it is possible to prevent time loss and poor focus.

The above description deals with the optical information storage medium reproduction apparatus 10 that is capable of reproducing the double-layer super resolution optical information storage medium 100d as one of examples of the super resolution optical information storage medium. However, the double-layer super resolution optical information storage medium may be an n-layer optical information storage medium (n≧2), the second information recording layer 104d may be an nth information recording layer, and the reproduction laser power Pr2 for the second information recording layer may be reproduction laser power Prn for the nth information recording layer. That is, the optical information storage medium reproduction apparatus 10 may be an optical information storage medium reproduction apparatus that is capable of reproducing a multilayer super resolution optical information storage medium having n (n is an integer not less than 2) pieces of information recording layers.

One of the reasons is that a relationship between the first information recording layer and the nth information recording layer in reproduction laser power and endurance does not change regardless of whether n is 2 or not less than 2.

This is apparent from the following fact, for example. That is, the nth information recording layer is read definitely with reproduction light that has passed through the first information recording layer. Therefore, in order to obtain a temperature and light amount necessary for the super resolution reproduction, reproduction laser power higher than power necessary for the first information recording layer is required.

Further, another reason is as follows. That is, since the first information recording layer needs to pass light therethrough to some extent so as to enable the reading of the nth information recording layer, it is necessary that a reflection film, a light-absorbing layer, and a functional layer should be formed thin. This causes unstable states of materials and the like, thereby resulting in that the change in reflectance or the like in the first information recording layer becomes large along with an increase in the number of reproduction times.

(Advantageous Effects of the Present Invention)

In addition to the above description, the present invention can be described as follows. That is, the present invention relates to an optical information storage medium reproduction apparatus for reproducing an optical information storage medium in which information is stored with high density.

The present invention relates to an optical information storage medium reproduction apparatus for recording and reproducing information with the use of light such as a laser beam or the like, or for reading a read-only optical information storage medium. More specifically, the present invention relates to an optical information storage medium reproduction apparatus for reproducing an optical information storage medium, a method for reproducing an optical information storage medium and an optical information storage medium, each of which employs a super resolution optical information storage medium technique for reading a recording mark that is not longer than an optical resolution limit defined by a light spot diameter at diffraction limit.

An optical information storage medium reproduction apparatus of the present invention is an optical information storage medium reproduction apparatus that is capable of reproducing a multilayer optical information storage medium having n (n is an integer not less than 2) pieces of information recording layers including a reproduction film that allows reading of a recording mark shorter than a resolution limit of the optical information storage medium reproduction apparatus. The optical information storage medium reproduction apparatus satisfies Pr1 min≦Pr1<Prn, where Pr1 is reproduction laser power for reading a first information recording layer, which is closest to a reproduction-light-incident surface of the optical information storage medium, Prn is reproduction laser power for reading an nth information recording layer, which is farthest from the reproduction-light-incident surface, and Pr1 min is minimum reproduction laser power that satisfies a reproduction signal characteristic necessary for the optical information storage medium reproduction apparatus at the time of reading the first information recording layer.

With the arrangement, at the time of reading the first information recording layer, which is closest to the reproduction-light-incident surface of the multilayer super resolution optical information storage medium, the reproduction signal characteristic necessary for the optical information storage medium reproduction apparatus is satisfied, thereby preventing a decrease in reflectance and a deterioration in reproduction signal characteristic along with an increase in the number of reproduction times, as compared with a conventional optical information storage medium reproduction apparatus. As a result, it is possible to stably read the first information recording layer.

An optical information storage medium reproduction apparatus of the present invention is an optical information storage medium reproduction apparatus (i) which is capable of reproducing a multilayer optical information storage medium having n (n is an integer not less than 2) pieces of information recording layers each having a recording mark shorter than 120 nm and (ii) which includes an optical system including a laser that irradiates light having a wavelength of about 405 nm and an objective lens having a numerical aperture of substantially 0.85. The optical information storage medium reproduction apparatus satisfies Pr1 min≦Pr1<Prn, where Pr1 is reproduction laser power for reading a first information recording layer, which is closest to a reproduction-light-incident surface of the optical information storage medium, Prn is reproduction laser power for reading an nth information recording layer, which is farthest from the reproduction-light-incident surface, and Pr1 min is minimum reproduction laser power that satisfies a reproduction signal characteristic necessary for the optical information storage medium reproduction apparatus at the time of reading the first information recording layer.

In this arrangement, the optical information storage medium reproduction apparatus of the present invention includes an optical system including a laser that irradiates light having a blue laser wavelength like a Blu-ray Disc (registered trademark) reproduction apparatus and an objective lens having a numerical aperture of substantially 0.85. Further, in the arrangement, the optical information storage medium reproduction apparatus satisfies its necessary reproduction signal characteristic at the time of reading a first information recording layer, which is closest to a reproduction-light-incident surface of a read-only type multilayer super resolution optical information storage medium. Consequently, with the arrangement, it is possible to prevent a decrease in reflectance and a deterioration in reproduction signal characteristic along with an increase in the number of reproduction times, as compared to a conventional optical information storage medium reproduction apparatus, thereby allowing stable reading of the first information recording layer.

An optical information storage medium reproduction apparatus of the present invention is an optical information storage medium reproduction apparatus (i) which includes an optical system including a laser that irradiates light having a wavelength of substantially 405 nm and an objective lens having a numerical aperture of substantially 0.85 and (ii) which is capable of reproducing a multilayer optical information storage medium having n (n is an integer not less than 2) pieces of information recording layers in which information is stored in the form of a plurality of recording marks including a recording mark shorter than 120 nm. The optical information storage medium reproduction apparatus satisfies Pr1 min≦Pr1<Prn, where Pr1 is reproduction laser power for reading a first information recording layer, which is closest to a reproduction-light-incident surface of the optical information storage medium, Prn is reproduction laser power for reading an nth information recording layer, which is farthest from the reproduction-light-incident surface, and Pr1 min is minimum reproduction laser power that satisfies a reproduction signal characteristic necessary for the optical information storage medium reproduction apparatus at the time of reading the first information recording layer.

In this arrangement, the optical information storage medium reproduction apparatus of the present invention includes an optical system including a laser that irradiates light having a blue laser wavelength like a Blu-ray Disc (registered trademark) reproduction apparatus and an objective lens having a numerical aperture of substantially 0.85. Further, the optical information storage medium reproduction apparatus satisfies its necessary reproduction signal characteristic at the time of reading a first information recording layer, which is closest to a reproduction-light-incident surface of a writable type multilayer super resolution optical information storage medium. Consequently, with the arrangement, it is possible to prevent a decrease in reflectance and a deterioration in reproduction signal characteristic along with an increase in the number of reproduction times, as compared to a conventional optical information storage medium reproduction apparatus, thereby allowing stable reading of the first information recording layer.

The optical information storage medium reproduction apparatus of the present invention satisfies 1.05×Pr1 min≦Pr1≦0.95×Prn.

Here, the optical information storage medium reproduction apparatus requires a margin for reproduction power for its reproduction system so as to cope with environmental differences at the time of reproduction. The environmental differences at the time of reproduction may encompass production variability between individual lasers for use in individual optical information storage medium reproduction apparatuses, assembling variability between individual optical systems for use in individual optical information storage medium reproduction apparatuses, production variability between individual optical information storage media, and the like.

Further, as the optical information storage medium reproduction apparatus is more accurate, a necessary amount of the margin becomes smaller. However, a general optical information storage medium reproduction apparatus requires a margin ratio of at least 5%. On this account, in the present invention, Pr1 is set such that each of an upper limit and a lower limit of Pr1 has a 5% reproduction power margin. That is, the optical information storage medium reproduction apparatus of the present invention satisfies 1.05×Pr1 min≦Pr1≦0.95×Prn.

With the arrangement, the optical information storage medium reproduction apparatus of the present invention satisfies its necessary reproduction signal characteristic at the time of reading a first information recording layer, which is closest to a reproduction-light-incident surface of a multilayer super resolution optical information storage medium, without being affected by production variability between individual lasers for use in individual optical information storage medium reproduction apparatuses, assembling variability between individual optical systems for use in individual optical information storage medium reproduction apparatuses, production variability between individual optical information storage media, and environmental differences at the time of reproduction. As a result, it is possible to restrain a decrease in reflectance and a deterioration in reproduction signal characteristic along with an increase in the number of reproduction times, as compared to a conventional optical information storage medium reproduction apparatus, thereby making it possible to more stably read the first information recording layer.

The optical information storage medium reproduction apparatus of the present invention is arranged such that reproduction laser power is set lower than Prn at the time of moving its focus (hereinafter just referred to as "movement between layers) from a first information recording layer onto an nth information recording layer or from the nth information recording layer onto the first information recording layer.

In a case where the reproduction laser power is set not lower than Prn at the time of moving the focus from the nth information recording layer onto the first information recording layer, there may occur such a problem that the first information recording layer may be rendered unreadable irreversibly. In contrast, if the reproduction laser power is set lower than Prn at this time, it is possible to prevent the problem that the first information recording layer is rendered unreadable irreversibly. The reproduction laser power is preferably set to Pr1.

Assume Prx is reproduction laser power which is lower than Prn but which is not Pr1 and the reproduction laser power is set to Prx at the time of moving the focus from the first information recording layer to the nth information recording layer or from the nth information recording layer to the first information recording layer. At this time, the reproduction laser power is set to a value that is different from both reproduction laser power Pr1 for the first information recording layer and reproduction laser power Prn for the nth information recording layer. Therefore, the reproduction laser power should be once set to Prx before the reproduction laser power is changed from Pr1 to Prn and vice versa. That is, the laser power should be changed in two stages for one focus movement between layers, thereby causing the focus movement between layers to take time. Further, if Prx is set to a value largely different from Pr1 or Prn, there may occur such a problem that the focus on each of the information recording layers may become poor.

For these reasons, when the reproduction laser power is set to Pr1 at the time of the focus movement between layers, it is possible to focus an intended information recording layer in a time efficient manner.

The optical information storage medium reproduction apparatus of the present invention performs reproduction in the order from a first information recording layer in a case of an optical information storage medium where n=2. In a case of an optical information storage medium reproduction apparatus that reads a second information recording layer first, there may occur such a problem that the first information recording layer is focused accidentally so that the first information recording layer is read with Pr2, which is high reproduction laser power, thereby causing the first information recording layer to be unreadable irresistibly. In contrast, with the above arrangement, since the optical information storage medium reproduction apparatus of the present invention reads the first information recording layer first, it is possible to prevent such a problem. Further, in a case where a double-layer super resolution optical information storage medium, where n=2, is a medium from which the optical information storage medium reproduction apparatus can identify values of Pr1 and Pr2 before it starts to reproduce the medium, the optical information storage medium reproduction apparatus starts to read the first information recording layer with Pr1 and the second information recording layer with Pr2. This yields an effect that the reproduction can be performed in a time efficient manner.

The present embodiment discloses an optical information storage medium reproduction apparatus for reproducing an optical information storage medium. However, the present invention is not limited to this, and may include a read-only or write-only apparatus and a read/write apparatus. Further, the usage of such an apparatus is not limited in any particular manner, and the apparatus may be stationary, portable, or the like.

As described above, an optical information storage medium reproduction apparatus, according to the present invention, for reproducing an optical information storage medium in which a plurality of information recording layers are laminated, each of the plurality of information recording layers including a recording mark having a length shorter than an optical system resolution limit. The optical information storage medium reproduction apparatus of the present invention reads an information recording layer closest to a reproduction-laser-incident surface of the optical information storage medium, with reproduction laser power that is set to be lower than reproduction laser power for reading an information recording layer farthest from the reproduction-laser-incident surface but not lower than minimum reproduction laser power that satisfies a reproduction signal characteristic necessary for the optical information storage medium reproduction apparatus.

Further, an optical information storage medium reproduction apparatus according to the present invention, is an optical information storage medium for reproducing an optical information storage medium in which a plurality of information recording layers are laminated, each of the plurality of information recording layers including a recording mark having a length not longer than 120 nm, the optical information storage medium reproduction apparatus includes an optical system including a laser light source capable of irradiating laser light having a wavelength of not less than 400 nm but not more than 410 nm and an objective lens having a numerical aperture of not less than 0.83 but not more than 0.87. The optical information storage medium reproduction apparatus of the present invention reads an information recording layer closest to a reproduction-laser-incident surface of the optical information storage medium, with reproduction laser power that is set to be lower than reproduction laser power for reading an information recording layer farthest from the reproduction-laser-incident surface but not lower than minimum reproduction laser power that satisfies a reproduction signal characteristic that the optical information storage medium reproduction apparatus requires.

Furthermore, an optical information storage medium reproduction apparatus according to the present invention is an optical information storage medium reproduction apparatus for reproducing an optical information storage medium in which a plurality of information recording layers are laminated, each of the plurality of information recording layers including a recording mark having a length not longer than 120 nm, the optical information storage medium reproduction apparatus includes an optical system including a laser light source capable of irradiating laser light having a wavelength of not less than 400 nm but not more than 410 nm and an objective lens having a numerical aperture of 0.85. The optical information storage medium reproduction apparatus of the present invention reads an information recording layer closest to a reproduction-laser-incident surface of the optical information storage medium, with reproduction laser power that is set to be lower than reproduction laser power for reading an information recording layer farthest from the reproduction-laser-incident surface but not lower than minimum reproduction laser power that satisfies a reproduction signal characteristic that the optical information storage medium reproduction apparatus requires.

A control method, according to the present invention is a method for controlling an information storage medium reproduction apparatus for reading an optical information storage medium in which a plurality of information recording layers are laminated, each of the plurality of information recording layers including a recording mark having a length shorter than an optical system resolution limit. The control method of the present invention includes setting, at the time of reading an information recording layer closest to a reproduction-laser-incident surface of the optical information storage medium, reproduction laser power to be lower than reproduction laser power for reading an information recording layer farthest from the reproduction-laser-incident surface but not lower than minimum reproduction laser power that satisfies a reproduction signal characteristic that the optical information storage medium reproduction apparatus requires.

In the above arrangement, at the time of reading the information recording layer closest to the reproduction-laser-incident surface of the optical information storage medium, the optical information storage medium reproduction apparatus sets reproduction laser power to be lower than reproduction laser power for reading the information recording layer farthest from the reproduction-laser-incident surface but not lower than minimum reproduction laser power that satisfies a reproduction signal characteristic that the optical information storage medium reproduction apparatus requires. Accordingly, the optical information storage medium reproduction apparatus reads the information recording layer closest to the reproduction-laser-incident surface by irradiating the information recoding layer with laser light having the reproduction laser power thus set. As a result, with the above arrangement, it is possible to prevent that the information recording layer closest to the reproduction-laser-incident surface is read with inappropriately high reproduction laser power, thereby making it possible to prevent a decrease in reflectance and a deterioration in reproduction signal characteristic along with repeat reproduction. Consequently, it is possible to stably reproduce a multilayer super resolution optical information storage medium like the above optical information storage medium.

In a case where a conventional optical information storage medium reproduction apparatus reproduces a multilayer information storage medium including n (n is an integer not less than 2) information recording layers, the same reproduction laser power is employed to read a first information recording layer, which is first from the reproduction-laser-incident surface, and an nth information recording layer, which is nth from the reproduction-laser-incident surface. For example, in a case where a conventional double-layer optical information storage medium is reproduced, the first information recording layer and the second information recording layer are read with the same reproduction laser power.

In view of this, the inventor(s) of the present invention found the following fact. That is, in the case where the first information recording layer and the second information recording layer of the double-layer super resolution optical information storage medium are read with the same reproduction laser power as such, recording marks of the first information recording layer are damaged, thereby resulting in that information stored in the first information recording layer is rendered unreadable.

The above arrangement of the present invention is applicable to an optical information storage medium reproduction apparatus including an optical system constituted by (i) a laser light source capable of irradiating laser light which is like a blue laser employed by a Blu-ray Disc (registered trademark) reproduction apparatus and which has a wavelength of not less than 400 nm but not more than 410 nm, and (ii) an objective lens having a numerical aperture of 0.85. It should be noted that even if the numerical aperture has an error of around ±0.02, it hardly affects the advantageous effects of the present invention. On this account, the numerical aperture may be not less than 0.83 but not more than 0.87.

Furthermore, the above arrangement of the present invention is also applicable to reading of information recording layers, such as an information recording layer on which a plurality of recording marks including a recording mark shorter than 120 nm have been formed, and an information recording layer in which information is to be recorded in the form of a plurality of recording marks including a recording mark shorter than 120 nm.

The above optical information storage medium may be a read-only optical information storage medium (read-only type) in which information has been already recorded, or an optical information storage medium (writable/readable type) in which a piece of information has been partially recorded and another piece of the information may be additionally recorded and in which the piece of information has been recorded in at least one of a plurality of information recording layers.

In addition, the optical information recording medium reproduction apparatus according to the present invention is arranged such that the reproduction laser power with which the optical information recording medium reproduction apparatus reads the information recording layer closest to the reproduction-laser-incident surface is set to be not higher than 0.95 times the reproduction laser power for reading the information recording layer farthest from the reproduction-laser incident surface, but not lower than 1.05 times the minimum reproduction laser power that satisfies the reproduction signal characteristic that the optical information recording layer requires at the time of reading the information recording layer closest to the reproduction-laser-incident surface.

Generally, there are various factors that affect quality in reproduction at the time of reproduction. Examples of such factors are production variability between individual lasers for use in individual optical information storage medium reproduction apparatuses, assembling variability between individual optical systems for use in individual optical information storage medium reproduction apparatuses, production variability between individual optical information storage media, and environmental differences at the time of reproduction.

In order to cope with such factors, a reproduction laser power margin, which is a reproduction laser power range for a practical reproduction signal characteristic, is required. More specifically, the reproduction laser power margin indicates an allowable range within which the reproduction laser power may vary. Generally, as accuracy of, for example, an optical pickup of the optical system of the optical information storage medium reproduction apparatus becomes higher, an amount of the reproduction laser power margin becomes smaller. However, since there is variability between individual media and the like, it is necessary that the reproduction laser power have at least 5% latitude with respect to each of theoretical upper limit and lower limit.

As such, in the above arrangement, the reproduction laser power margin has at least 5% latitude with respect to each of the theoretical upper limit and lower limit. As a result, the arrangement further makes it possible that the reproduction can be performed without being affected by production variability between individual laser light sources for use in individual optical information storage medium reproduction apparatuses, assembling variability between individual optical systems for use in individual optical information storage medium reproduction apparatuses, production variability between individual optical information storage media, environmental differences at the time of reproduction, and the like.

Further, the optical information storage medium reproduction apparatus of the present invention is arranged such that at the time of focus movement from an information recording layer onto another information recording layer, the optical information storage medium reproduction apparatus moves the focus from the information recording layer to the another information recording layer with reproduction laser power being maintained to be lower than the reproduction laser power for reading the information recording layer farthest from the reproduction-laser-incident surface.

With the arrangement, even when the focus is moved from the information recording layer farthest from the reproduction-laser-incident surface onto the information recording layer closest to the reproduction-laser-incident surface and vice versa, it is possible to restrain that the information recording layer closest to the reproduction-laser-incident surface is read with inappropriately high reproduction laser power. This results in that it is possible to prevent a decrease in reflectance and a deterioration in reproduction signal characteristic along with repeat reproduction.

In the above arrangement, it is preferable that the optical information storage medium reproduction apparatus move the focus from the information recording layer to the another information recording layer with reproduction laser power for reading one of the information recording layers that is closer to the reproduction-laser-incident surface.

In the arrangement, when the focus is moved between layers, the reproduction laser power is changed only once. This can improve efficiency and further prevent poor focus.

Further, the optical information storage medium reproduction apparatus according to the present invention is arranged such that in a case where the optical information storage medium includes 2 information recording layers, the optical information storage medium reproduction apparatus reproduces the optical information storage medium in the order from one of the 2 information recording layers that is closer to the reproduction-laser-incident surface than the other one of the 2 information recording layers.

Assume that an optical information storage reproduction apparatus reproduces a double-layer optical information storage medium, which includes 2 information recording layers, and the optical information storage medium reproduction apparatus performs reproduction in the order from one of the information recording layers that is farther from a reproduction-laser-incident surface of the medium than the other one. In this case, if the other one of the information recording layers that is closer to the reproduction-laser-incident surface is read wrongly with reproduction laser power for the information recording layer farther from the reproduction-laser-incident surface, there may occur such a problem that the information recording layer closer to the reproduction-laser-incident surface is rendered unreadable irreversibly.

However, with the above arrangement of the present invention, it is possible to prevent that the information recording layer closer to the reproduction-laser-incident surface is irradiated with light having such inappropriately high reproduction laser power, thereby preventing a deterioration in reproduction characteristic of the information recording layer closer to the reproduction-laser-incident surface.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention can be widely and preferably applied to an optical information storage medium reproduction apparatus and the like which performs super resolution reproduction of a multilayer optical information storage medium.

The invention claimed is:

1. A reproduction method for reproducing a rewritable and readable optical information storage medium (i) which includes n (n is an integer of not less than 2) pieces of information recording layers each including a recording mark having a length shorter than an optical system resolution limit, the recording mark being formed based on a 1-7PP modulation method, and (ii) which includes an area located near a center hole of the rewritable and readable optical information storage medium in which area medium information on a structure of the rewritable and readable optical information storage medium is stored, said reproduction method comprising:

setting reproduction laser power to satisfy $Pr1<Pm$ and $Pr1$ of not less than 1.0 mW but less than 1.1 mW, where $Pr1$ is reproduction laser power for reading a first information recording layer, in the rewritable and readable optical information storage medium, that is closest to a reproduction-laser-incident surface of the rewritable and readable optical information storage medium, and $Prn$ is reproduction laser power for reading an nth information recording layer, in the rewritable and readable optical information storage medium, that is farthest from the reproduction-laser-incident surface; and reading recorded information from the rewritable and readable optical information storage medium by use of a reproduction clock determined based on the medium information.

* * * * *